3,159,242
DETACHABLE BUMPER STEP
Ralph E. James, 2734, N. Grantland, Fresno 5, Calif.
Filed Sept. 20, 1963, Ser. No. 310,255
3 Claims. (Cl. 182—92)

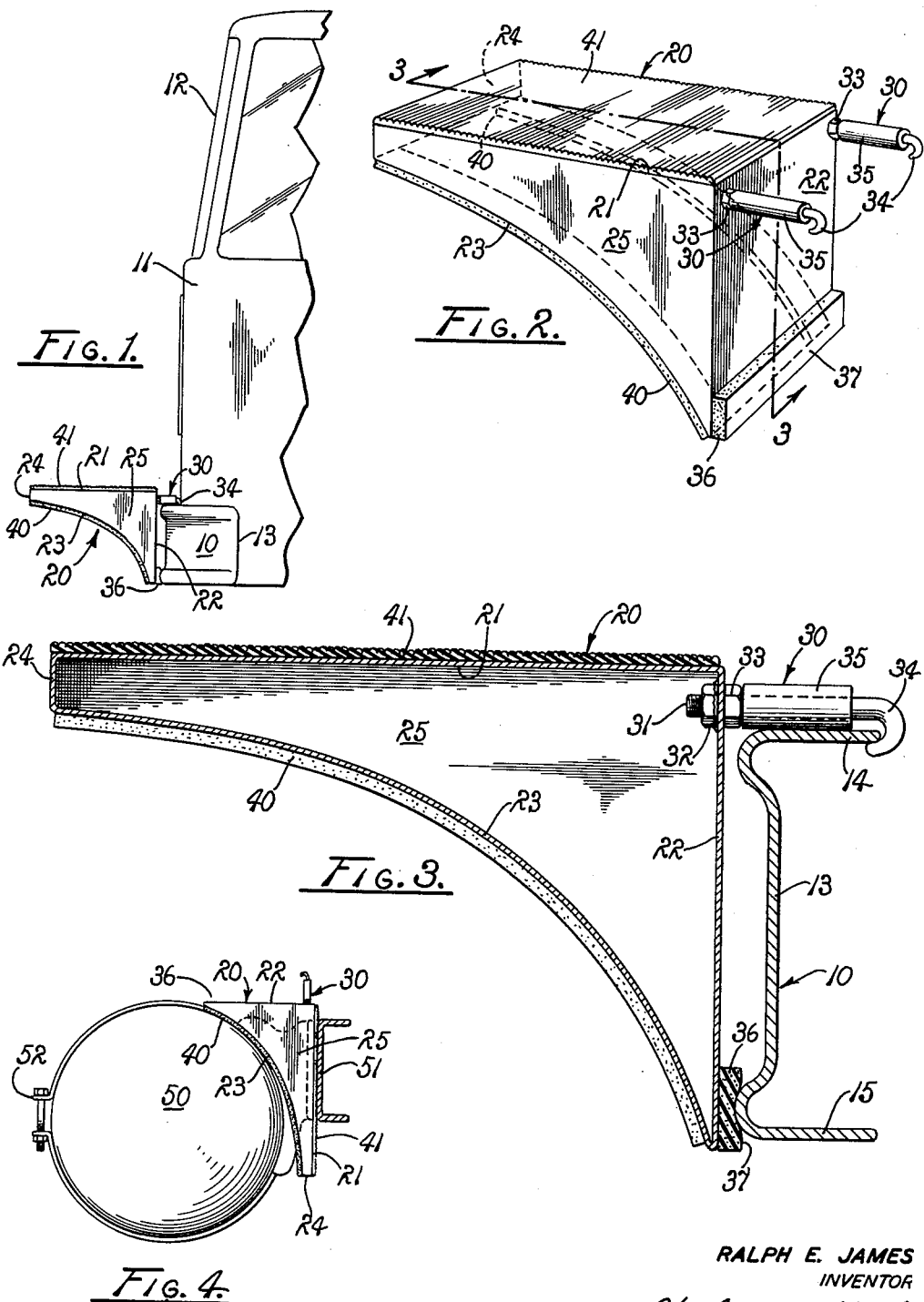

The present invention relates to a detachable bumper step having particular utility in connection with the maintenance and servicing of automotive vehicles of large size, such as heavy-duty trucks, buses and the like.

The problem of access to elevated portions of contemporary models of such automotive vehicles severely hampers maintenance and service operations. When such operations are performed at a service garage or maintenance center, various types of portable scaffolds and stands, such as step-ladders and the like, normally are employed as expedients to facilitate proper access. Personnel performing such services all too frequently resort to climbing and standing upon portions of the vehicle, such as fenders, bumpers, door hinges, and like parts offering limited surfaces of support. Such practices not only cause damage to the protective surface coatings of such parts, but are unsafe.

Although avoiding such safety hazards, the use of previously available portable stands does not permit storage thereof on the vehicle, so that the stand is readily available at all times and at locations remote from the garage or maintenance center where servicing or other attention may be required. Consequently, when at remote locations, operators frequently resort to the hazardous and damaging practice of clambering over the vehicle when performing minor service or repair to elevated portions of their vehicle.

Accordingly, it is an object of the present invention to provide a detachable bumper step ideally suited for use in servicing large automotive vehicle.

Another object is to provide such a bumper step of lightweight, rigid material and of a configuration permitting convenient storage on such vehicles.

Another object is to include in such a bumper step adjusting means to accommodate bumpers of various sizes and to afford protection for the surface coatings of such bumpers.

Another object is to provide a portable bumper step which dependably releasably engages the bumper of a vehicle and affords a surface of support for maintenance personnel which promotes the safety of such personnel.

The further object is to provide a bumper step which is readily portable and specifically adapted for storage adjacent to conventional fuel tanks now provided on many large trucks.

Still further objects and advantages will become apparent in the subsequent description here.

In the drawings:

FIG. 1 is a fragmentary view in side elevation of an automotive vehicle provided with a bumper on which is mounted a detachable bumper step embodying the principles of the present invention.

FIG. 2 is an enlarged perspective view of the bumper step of FIG. 1.

FIG. 3 is an enlarged view in vertical longitudinal section of the bumper step of FIG. 2 and taken on line 3—3 thereof.

FIG. 4 is a fragmentary view of the vehicle of FIG. 1 showing the bumper step thereof in a position of storage adjacent to the fuel tank of the vehicle.

Referring more particularly to FIG. 1, a heavy-duty bumper 10 is illustrated as being rigidly secured to a vehicle, fragmentarily illustrated at 11. Such bumpers are conventionally utilized on contemporary buses and large trucks. A windshield 12 is mounted on the vehicle, and is illustrated as one elevated portion thereof which requires rather frequent servicing. Although the present invention is suitable for use in the maintenance and service of elevated portions of such vehicles generally, access to the windshield 12 and associated supporting structure, conveniently illustrates the utility of the invention. The bumper 10 provides a substantially vertical rigid web 13 from which upper and lower horizontally disposed flanges 14 and 15 are integrally extended. The bumper 10 is usually provided with a surface of chromium plating or other type of surface coating intended to serve protective and decorative purposes.

As shown in FIG. 1, a bumper step 20 embodying the principles of the present invention is detachably secured to the bumper 10. The step 20 provides an upper platform 21, which is more clearly shown in FIG. 3. The platform 21 is formed of a substantially rigid material, such as commercially available steel plate of sufficient thickness, as in the order of 10 to 12 gauge material. The platform thereby constitutes a surface of support for workmen in gaining access to elevated portions of the vehicle, such as the windshield 12. The upper platform 21 is substantially rectangular in plan form and provides opposite end edges and opposite side edges. A reaction plate 22 depends downwardly from one of the opposite end edges of the platform 21, and in the preferred form illustrated is integral therewith and right-angularly related thereto. An alternative method of forming the platform 21 and the reaction plate 22 is rigidly joining these elements, as by welding.

An arcuately inwardly curved bottom web 23 extends from the lower edge of the reaction plate 22 and is joined to the opposite end of the platform 21 by means of a relatively short nose plate 24, as an extension of the web. The bottom web 23 functions as a strut between the platform 21 and the reaction plate 22, and serves as an alternate reaction member when the step 20 is disposed in a storage position as is described below. A pair of laterally opposed side gusset plates 25 are individually respectively joined to the platform 21, the reaction plate 22, and the bottom web 23, thereby to define a hollow chamber and provide an integral unit of minimum weight, high structural rigidity, and strength sufficient to support a workman on the platform 21.

A pair of laterally spaced anchor bolts 30 are adjustably rigidly secured to the reaction plate 22 by means of threaded shanks 31 received through suitable apertures in the plate. The shanks are individually screw-threadably joined to respective nuts 32 welded to the plate 22 and disposed internally of the hollow chamber formed in conjunction with the platform 21 and the web 23. Each of the anchor bolts 30 is provided with a respective lock nut 33 dependably to maintain an axial position of adjustment. The distal ends of each of the anchor bolts are provided with curved anchor heads 34 adapted to engage the upper flange 14 of the bumper 10. Accordingly, the bolts 30 constitute adjustable anchor means for the step 20 and serve to effect a dependable detachable mounting on the bumper 10.

Each of the anchor bolts 30 is provided with a tubular sleeve 35 of protective resilient material encompassing the threaded shank 31. The purpose of the sleeves is to prevent slipping of the anchor bolts on the surface of the bumper 10, as well as to protect the surface coating thereof. A resilient reaction pad 36, preferably formed of rubber, or like elastomeric material, is secured to the reaction plate at a position elevationally spaced below the anchor bolts 30. The pad 36 provides an engaging face 37 adapted to abut the bumper 10, and in conjunction with the anchor bolts 30, disposes the upper platform 21 in a substantially horizontal operative position.

The bottom web 23 is provided with a pair of laterally spaced strips 40 of resilient material, such as rubber, or the like, and afford a surface having a satisfactory coefficient of friction so as to maintain the step 20 in a position of storage, as illustrated in FIG. 4. The platform 21 is also preferably provided with a covering of frictional material 41 such as sheet rubber. The cover 41 serves the two-fold purpose of providing a safe surface of support for workmen using the bumper step as well as aiding the strips 40 in maintaining a position of storage.

Operation

The operation of the described embodiment of the subject invention is believed to be readily apparent and is briefly summarized at this point. Assuming that the bumper step 20 is to be employed in connection with the maintenance and service of a large vehicle, such as a heavy-duty truck, the step is ideally suited for portage and storage adjacent to the fuel tank of such trucks. As illustrated in FIG. 4, a saddle tank 50 of generally circular cross-sectional configuration is rigidly secured to the frame 51 of the vehicle as by a retaining clamp, generally indicated at 52. In such a position of mounting, an interval of spacing is usually provided between the periphery of the tank 50 and the frame 51. The arcuately inwardly curved bottom web 23 is formed at a radius somewhat larger than the radius of the circular tank configuration so that the step is wedged between the tank and the frame when disposed in the interval of spacing therebetween. Due to the compressible characteristic of the resilient strips 40 in conjunction with the cover 41 of frictional material, the step is dependably maintained in such a position of storage. Consequently, the step is available for use at all times to the operator of such a vehicle, regardless of his remoteness from a garage or maintenance center.

When need for a portable stand arises so as to permit the operator of the vehicle 11 to gain access to an elevated portion, such as the windshield 12, the bumper step 20 of the present invention conveniently fills such a need. The step is removed from the position of storage, illustrated in FIG. 4, and adjusted by means of the lock nuts 33 carried on the shanks 31 to determine the axial dimension of each of the anchor bolts 30 measured between the reaction plate 22 and the anchor heads 34. Upon completion of such adjustment, the anchor heads 34 are positioned as illustrated in FIG. 3 in engagement with the upper flange 14 of the bumper 10. The reaction pad 36 is gravitationally urged into contact with the lower portion of the bumper web 13 and thereby disposes the platform 21 in a substantially horizontal position. Accordingly, the bumper step, when so mounted on the bumper 10 provides a means of access to elevated portions of the vehicle.

Upon completion of any maintenance or service to such elevated portions, the step is readily detached from the bumper 10 and returned to the position of storage, illustrated in FIG. 4. Accordingly, the present invention provides a detachable portable bumper step of minimum weight and maximum dependability, and incorporates structural elements specifically intended to enhance the safety of workmen using the step, as well as to prevent damage to the protective and decorative surface coating of the bumper 10, and other portions of the vehicle contacted by the bumper step.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A bumper step adapted for selective storage on and detachable connection to a vehicle affording an anchorage and a reaction surface elevationally spaced therebelow, as well as affording a storage space between spaced elements, one of which is provided with a rounded external surface adjacent to said storage space, the step comprising a rigid platform providing opposite ends; a reaction plate secured to one of said ends and affording a lower depending edge; an arcuately inwardly curved web member joined at one end to the lower edge of said plate and at the opposite end to the other end of said plaform; anchor means adjustably rigidly mounted on said reaction plate elevationally superior to said lower edge and being adapted to engage said anchorage when the step is a position of connection to the vehicle; means carried by said reaction plate spaced elevationally below said anchor means and adapted to engage said reaction surface; said platform affording a frictional surface upwardly disposed when the step is detachably connected to the vehicle; and compressible retaining means carried by said web in spaced, cooperating relation to said frictional surface and adapted to be compressed between said elements dependably to retain the step in a position of storage.

2. A portable, lightweight bumper step adapted for selective detachable connection to and storage on a vehicle affording a bumper having an anchorage and a reaction surface elevationally spaced therebelow, as well as affording a storage space defined between spaced vehicle elements, one of which is provided with a rounded external surface facing said storage space, the step comprising a rigid platform providing opposite ends; a reaction member rigidly secured to one of said ends and affording a lower depending edge when in a position for connection to the vehicle; a web member joined to said reaction member and said platform and providing an arcuately inwardly curved surface extending from a point adjacent to said lower depending edge to a second point adjacent to the other end of said platform; a pair of spaced anchor bolts adjustably rigidly secured to said reaction member and disposed elevationally superior to said lower edge, each of said bolts having a projecting end formed to engage the anchorage of said bumper and also having a shank portion intermediate said projecting end and the reaction member; covering means affording a frictional surface secured to said platform and upwardly disposed when the step is detachably connected to the vehicle; and a resiliently compressible retaining strip secured to the arcuately inwardly curved surface of said web member in spaced, cooperating relation to said frictional surface and adapted to be compressed between said spaced elements to retain the step in a position of storage.

3. The bumper step of claim 2 wherein the respective shank of each of said anchor bolts is provided with a protective sleeve of resilient material covering the shank.

References Cited by the Examiner
UNITED STATES PATENTS

| | | | |
|---|---|---|---|
| 380,763 | 4/88 | Murphy | 182—206 |
| 1,415,699 | 5/22 | Porter | 182—90 |
| 2,806,642 | 9/57 | Miele | 182—120 |
| 2,964,767 | 12/60 | Egbert | 182—150 |

HARRISON R. MOSELEY, *Primary Examiner.*